W. C. STEWART.
MACHINE FOR PREPARING SOLES.
APPLICATION FILED JULY 3, 1916.

1,391,426.

Patented Sept. 20, 1921.
8 SHEETS—SHEET 1.

Witness
Frederick S. Greenbaf

Inventor
William C. Stewart
by his attorneys
Phillips, VanEverea Fish

W. C. STEWART.
MACHINE FOR PREPARING SOLES.
APPLICATION FILED JULY 3, 1916.

1,391,426.

Patented Sept. 20, 1921.
8 SHEETS—SHEET 4.

Witness
Frederick L. Grumbach

Inventor
William C. Stewart
by his attorneys
Phillips, Van Everen & Fish

W. C. STEWART.
MACHINE FOR PREPARING SOLES.
APPLICATION FILED JULY 3, 1916.

1,391,426.

Patented Sept. 20, 1921.
8 SHEETS—SHEET 5.

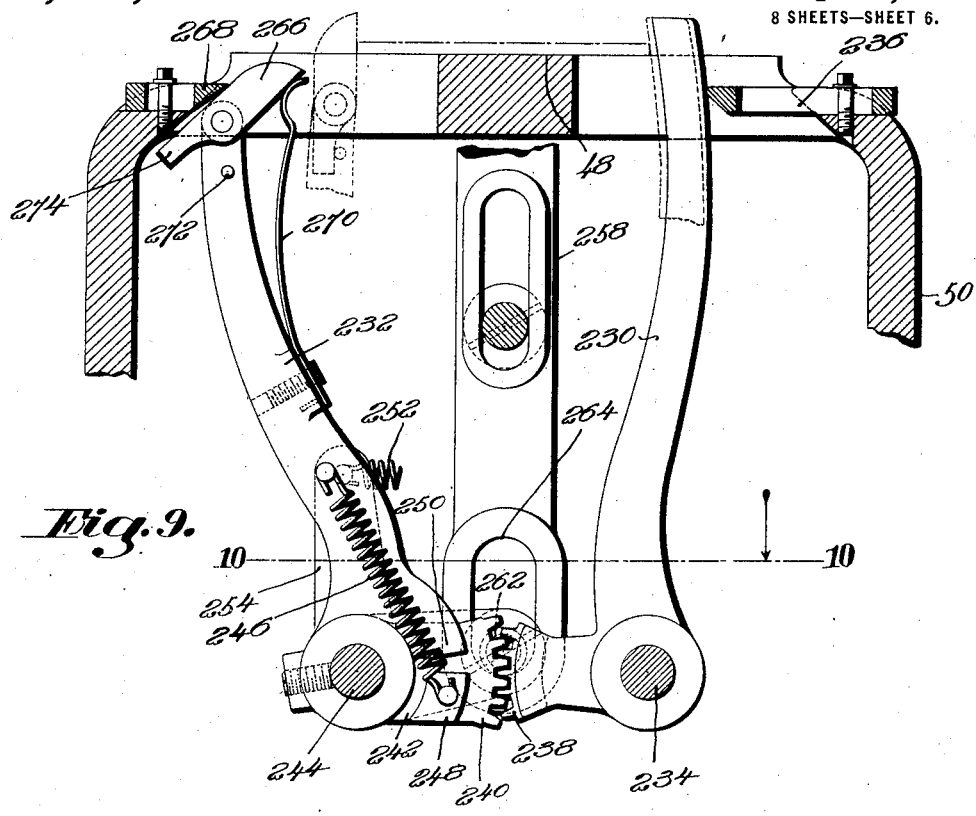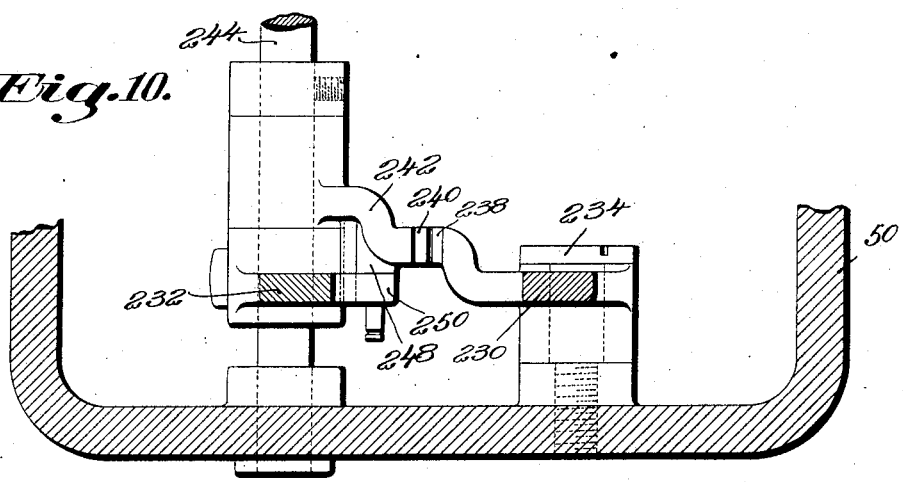

W. C. STEWART.
MACHINE FOR PREPARING SOLES.
APPLICATION FILED JULY 3, 1916.
1,391,426.
Patented Sept. 20, 1921.
8 SHEETS—SHEET 7.
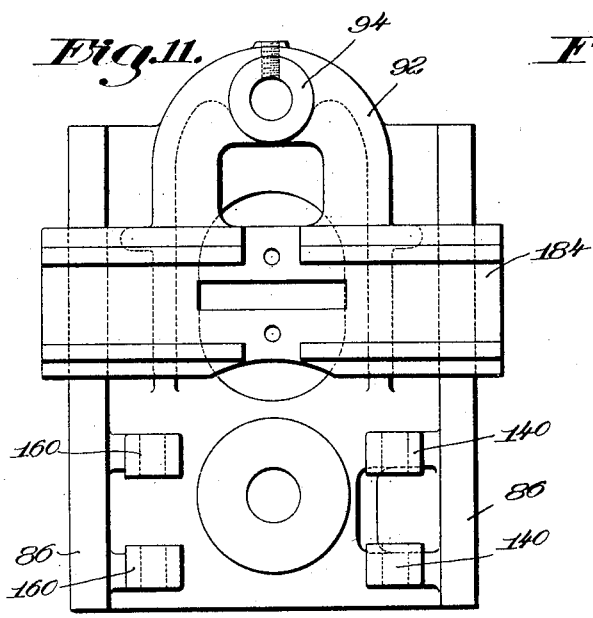
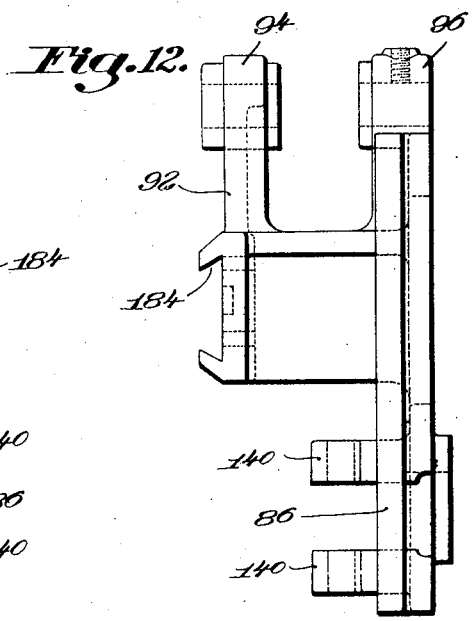
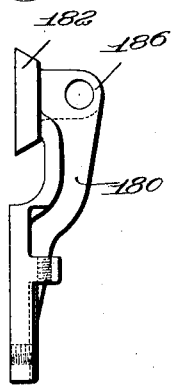
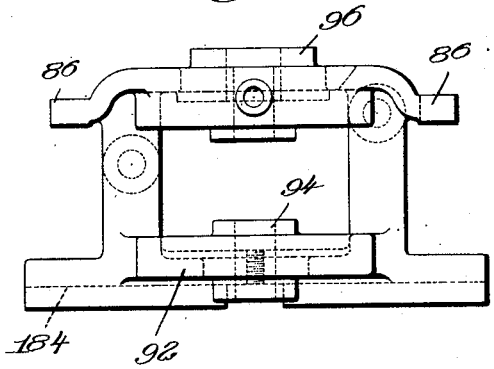
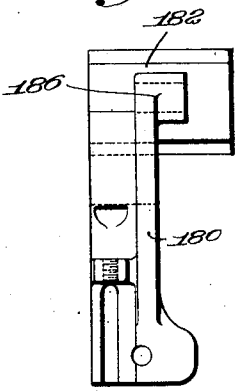

W. C. STEWART.
MACHINE FOR PREPARING SOLES.
APPLICATION FILED JULY 3, 1916.
1,391,426.
Patented Sept. 20, 1921.
8 SHEETS—SHEET 8.
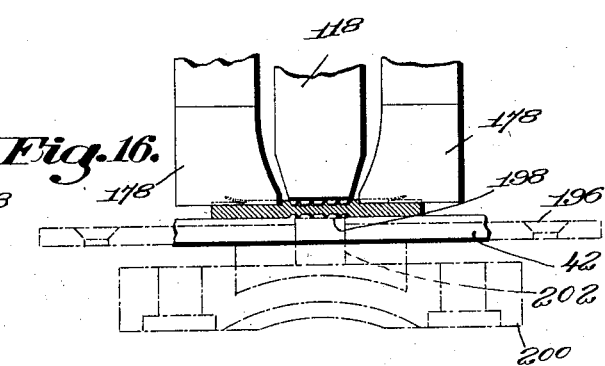
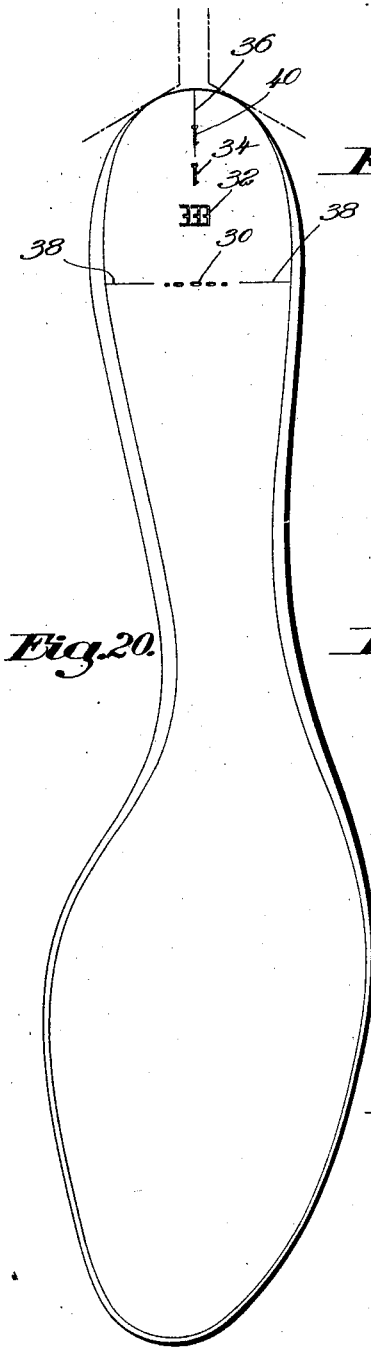
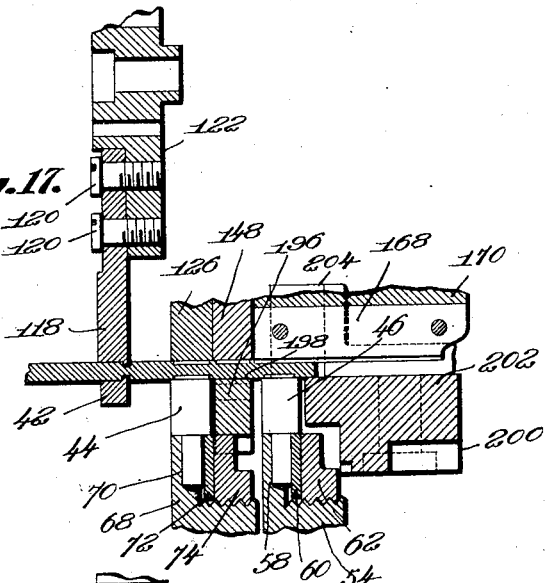
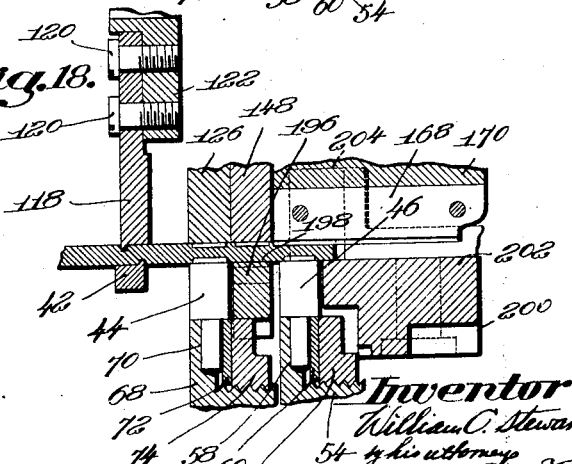

UNITED STATES PATENT OFFICE.

WILLIAM C. STEWART, OF SWAMPSCOTT, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR PREPARING SOLES.

1,391,426.	Specification of Letters Patent.	Patented Sept. 20, 1921.

Application filed July 3, 1916. Serial No. 107,290.

*To all whom it may concern:*

Be it known that I, WILLIAM C. STEWART, a subject of the King of Great Britain, residing at Swampscott, in the county of Essex and State of Massachusetts, have invented certain new and useful Improvements in Machines for Preparing Soles; and I do hereby declare the following to be a full, clear, and exact description of the invention, such as will enable others skilled in the art to which it appertains, to make and use the same.

This invention relates to machines for preparing soles for the lasting operation, and more particularly to an insole marking, scoring and lip cutting machine.

The primary object of the present invention is to improve the construction and mode of operation of insole marking machines so that insoles may be more accurately and rapidly marked without danger of injuring them.

Another object of the invention is to provide an improved sole centering device for sole marking machines which will facilitate the entering and removal of the sole and insure an accurate positioning of the sole.

A still further object of the invention is to provide an adjustment of the heel gage of an insole lip cutting and scoring machine to modify the usual size adjustment of the heel gage in taking care of the different styles of heels.

With these and other objects in view, the invention consists in the improved insole marking, scoring and lip cutting machine hereinafter described and set forth in the claims.

Figure 1:
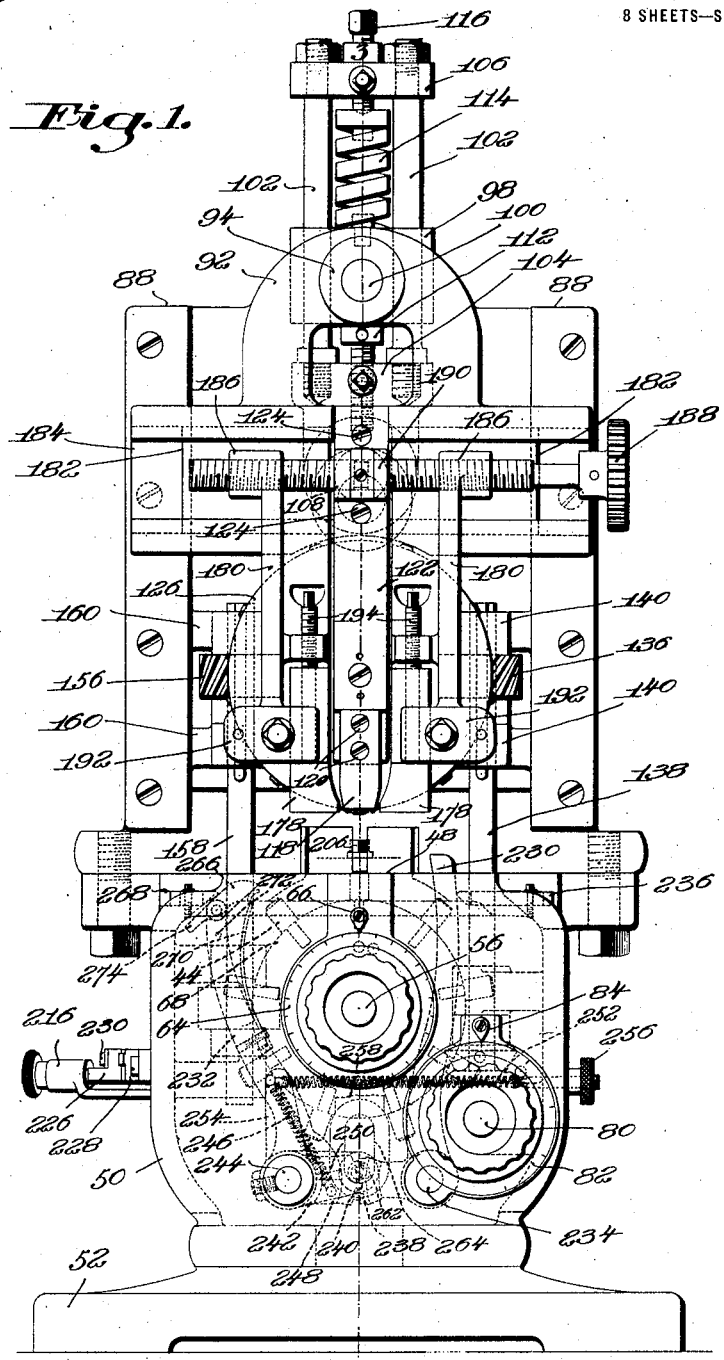
Figure 2:
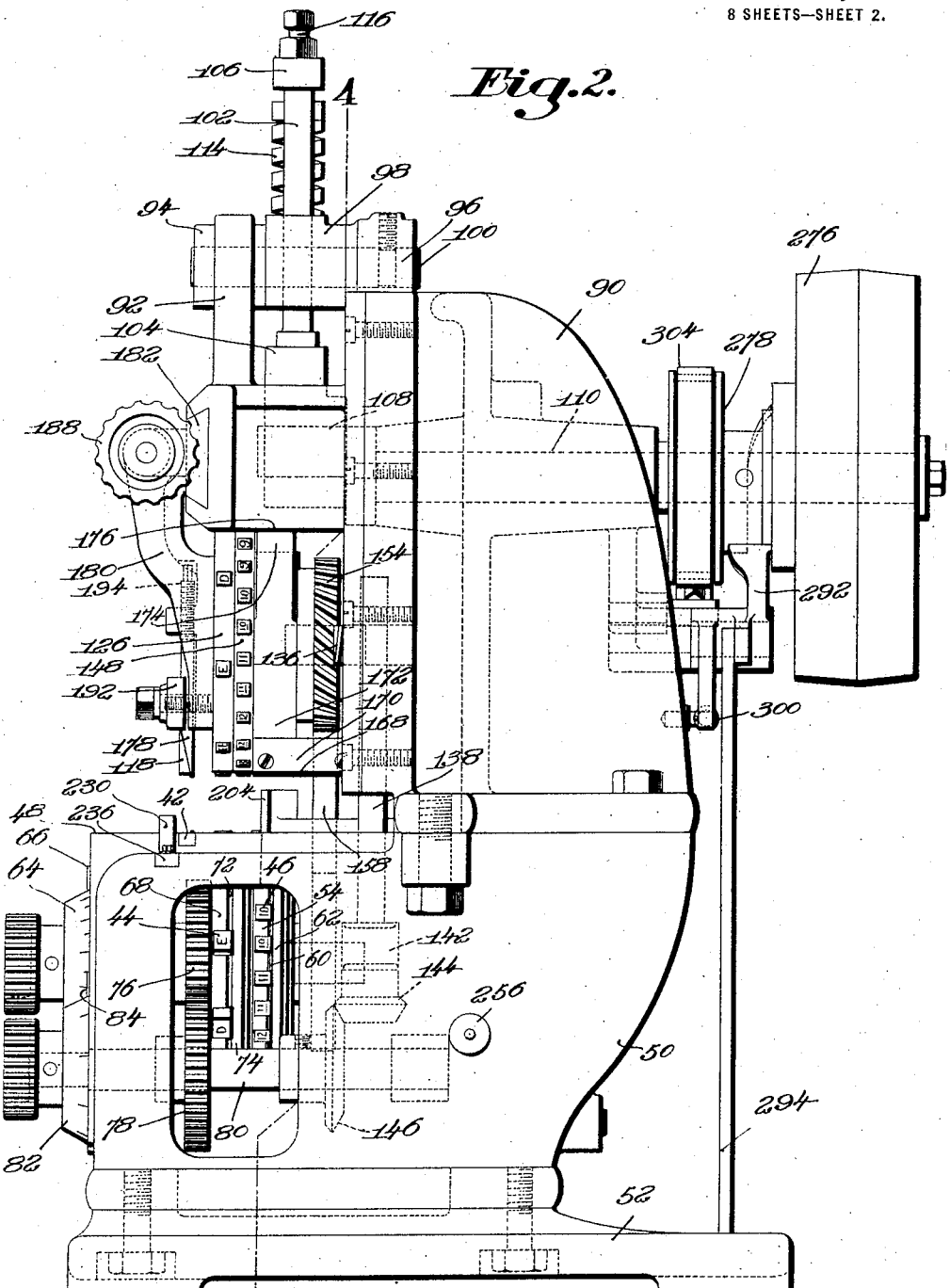
Figure 3:
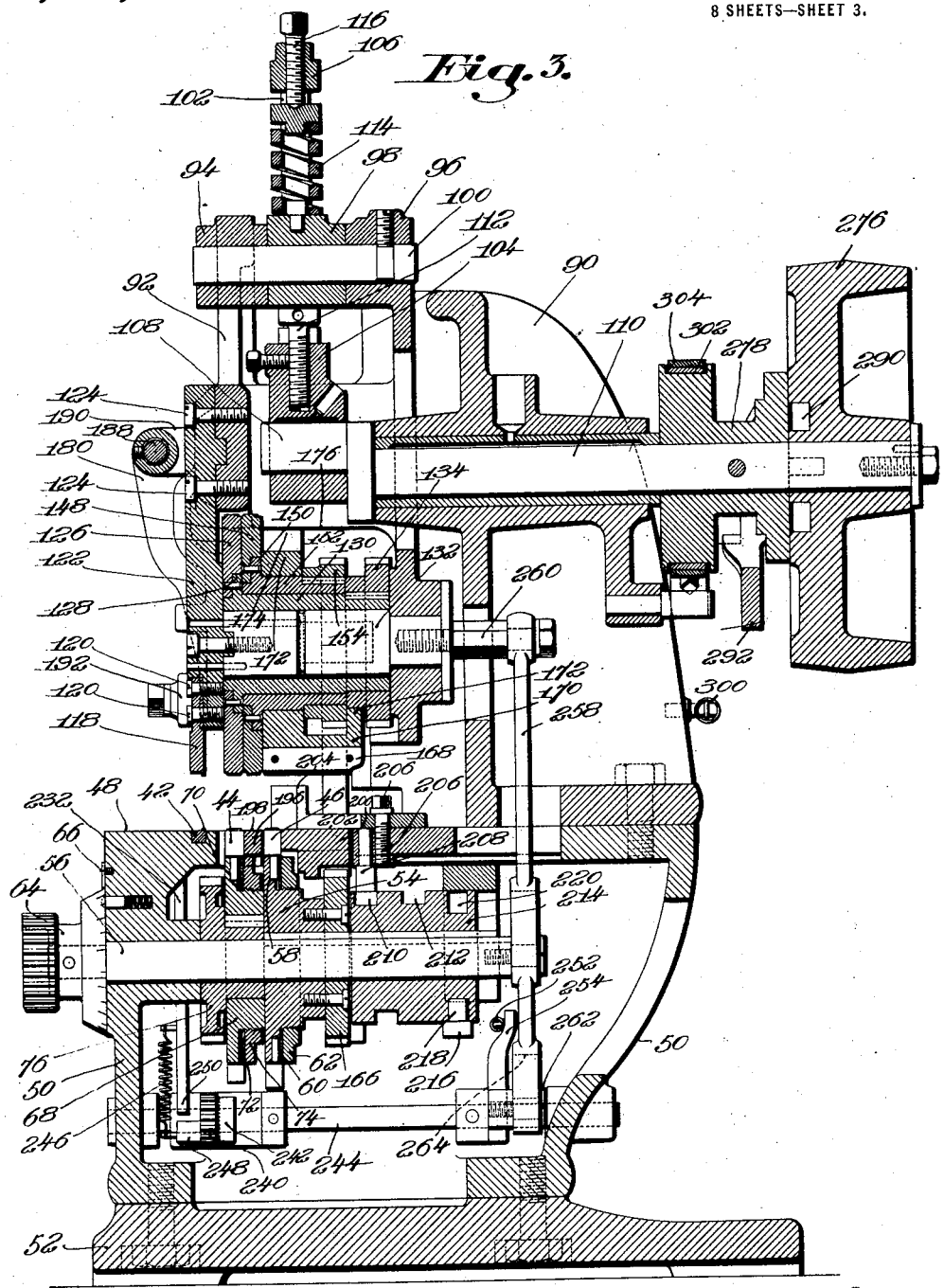
Figure 4:
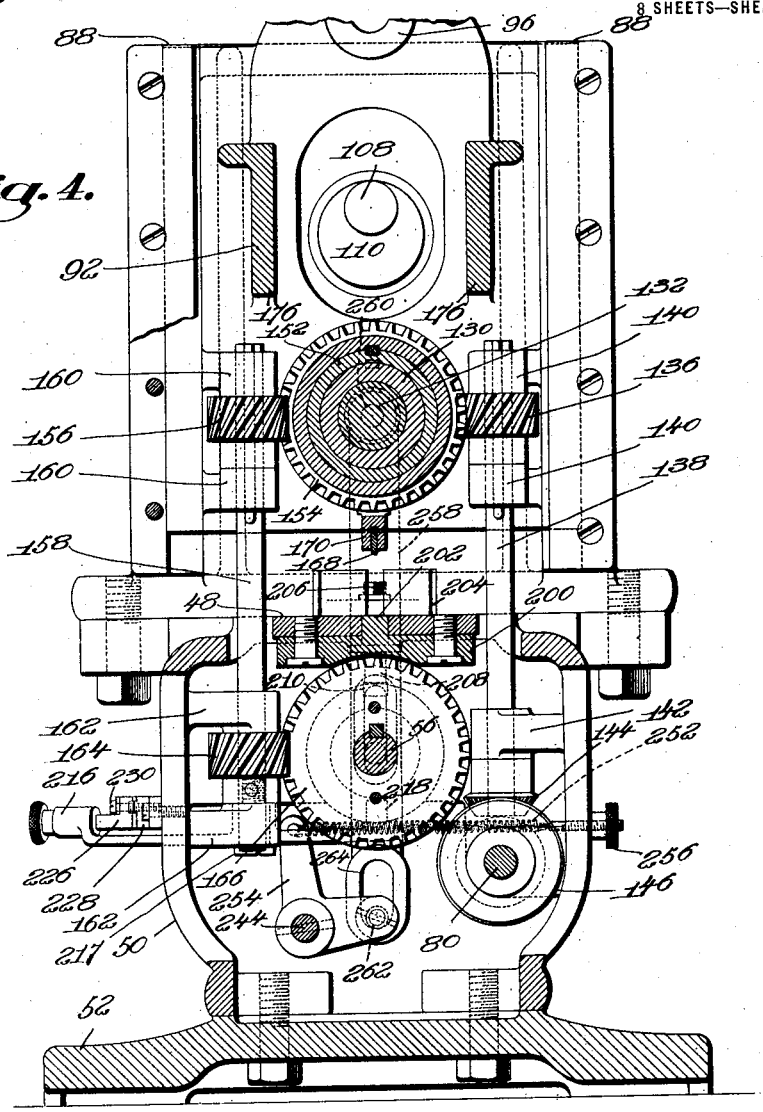
Figure 19:
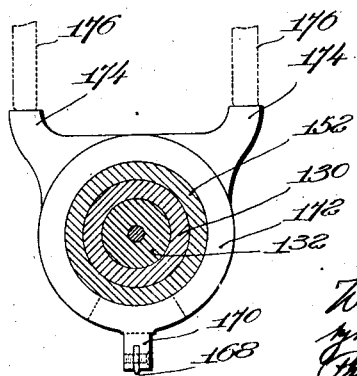
Figure 5:
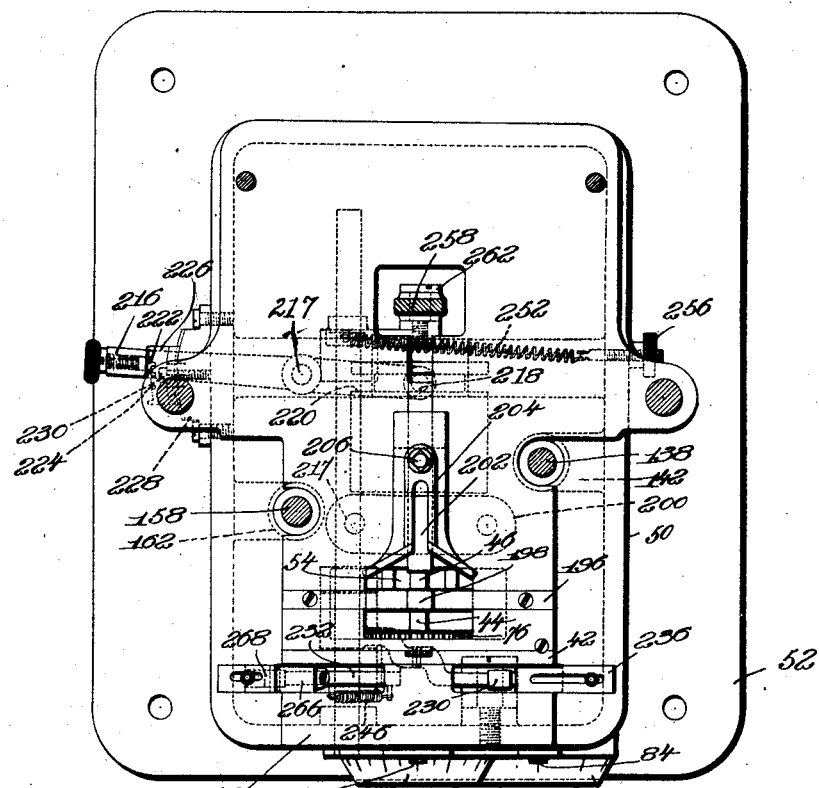
Figure 6:
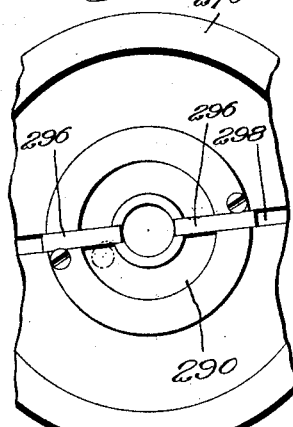
Figure 7:
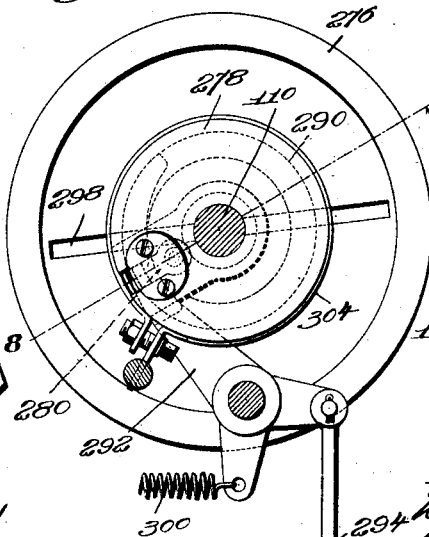
Figure 8:
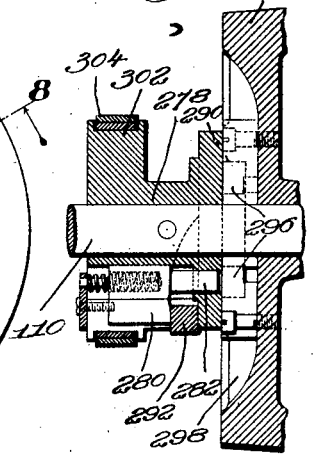

The various features of the invention are illustrated in the accompanying drawings, in which Figure 1 is a view in front elevation of an insole marking, scoring and lip cutting machine embodying the preferred form of the invention; Fig. 2 is a view in side elevation of the machine shown in Fig. 1; Fig. 3 is a vertical sectional view of the machine taken on the line 3—3, of Fig. 1; Fig. 4 is a vertical sectional view of the machine taken on the line 4—4, of Fig. 2; Fig. 5 is a plan view of the table or support of the machine, the machine head and marker carrier being removed; Figs. 6 and 7 are side elevations of the clutch driving mechanism; Fig. 8 is a sectional view of the clutch driving mechanism taken on the line 8—8, of Fig. 7; Fig. 9 is a detail view, partly in section, of the improved centering gages; Fig. 10 is a horizontal section of the centering gages taken on the line 10—10, of Fig. 9; Fig. 11 is a front elevation, Fig. 12 is a side elevation, and Fig. 13, a top plan view of the marker carrier; Fig. 14 is a side elevation and Fig. 15 is a front elevation of the lip cutter adjusting slide; Fig. 16 is a diagrammatic view illustrating the position of the scoring dies and lip cutting knives in operation upon a sole; Fig. 17 is a detail sectional view illustrating the scoring, width, size and centering dies in operation upon a sole; Fig. 18 is a view similar to Fig. 17, showing a modified form of scoring dies; Fig. 19 is a front elevation partly in section, of the heel centering marker; and Fig. 20 is a diagrammatic view of an insole illustrating the operation of the marking, scoring and lip cutting tools thereon.

In the machine illustrated in the drawings a channeled insole is prepared for the lasting operation. In preparing the insole, the flesh side is provided with a scoring mark 30 at the breast line; a width mark 32, a size mark, 34, and a heel centering line 36 on the heel seat, and lip cuts 38 are made at approximately the breast line, (see Fig. 20). On the grain side of the sole is placed a scoring mark corresponding to the scoring mark 30, a width mark corresponding to the mark 32, and a size mark 40. These marks are used for the insole reinforcing operations and for guiding the operative in the manufacture of the shoe after the insole has been attached to the last.

The lower or grain face of the sole is marked by means of a scoring die 42, width dies 44, and size dies 46. The scoring die is set flush with the face of a table or support 48 which forms the upper surface of a machine frame 50 mounted on a base 52. The size dies 46 are carried by a wheel 54, Figs. 3, 17 and 18, which is splined upon a size adjusting shaft 56, journaled in the machine frame 50. The size dies have shanks which are mounted in radial slots 58 formed around the periphery of the wheel 54, and the shanks are locked in position by means of a washer 60 and lock nut 62. On the size adjusting shaft 56 is secured a calibrated size dial 64, Figs. 1, 2 and 3, which bears against the front face of the machine frame 50. The dial 64 has a series of graduations which move under an index 66 to guide the operative in setting the different dies for marking the different sizes of the soles. The width marking dies 44 are carried by a wheel 68 which is freely rotatable upon the shaft 56. The width dies 44 are locked in slots 70 on the wheel 68 by means of washers 72 and lock nuts 74. To adjust the width wheel 68 to set the dies for marking different widths of soles, a gear 76 is secured to the width wheel 68 and meshes with a gear 78 which is fixed on a width adjusting shaft 80, Figs. 2 and 4, journaled in the machine frame 50. The width adjusting shaft carries a calibrated width dial 82, which is fixed to the shaft and bears against the front face of the frame 50. The dial 82 has a series of graduations which move across an index 84 to determine the setting of the size dies for marking different widths of soles.

The tools for marking the flesh side of the insole are all mounted in a marker carrier which is vertically reciprocated opposite the support to bring all of the tools simultaneously into engagement with the sole. The marker carrier is arranged to be adjusted with relation to the support to determine the proximity of the approach of the tools to the support. During the active stroke of the carrier, all of the tools therein are controlled by the action of a compression spring which provides for the different thicknesses of soles and prevents an excess pressure of the tools upon the sole so that it will not be injured. The marker carrier, more particularly shown in Figs. 11, 12 and 13, has a main body portion which is provided with a pair of guides 86 that slide in guide-ways 88, Fig. 4, formed on the front face of a machine head 90. A bracket 92 is formed on the upper portion of the carrier and has an upwardly projecting arm provided with a bearing 94 in alinement with a bearing 96 in the carrier. A block 98 is pivoted on a stud 100 between the bearings 94 and 96, Figs. 1 and 3. Supporting posts 102 are slidably mounted in the block 98 at each side of the stud 100, the lower ends of the posts being threaded into an eccentric block 104, and the upper ends of the posts being connected by a head block 106. The eccentric block 104 is mounted upon a crank 108 formed on the end of a main driving shaft 110 journaled in the machine head 90. An adjusting screw 112 is threaded into the upper face of the eccentric block 104 and bears against the lower face of the bearing block 98, by which the position of the marking tools in the carrier can be adjusted relatively to the work support. To yieldingly bring the tools down upon the sole a compression spring 114 is mounted between the upper face of the carrier block 98 and the lower face of the head block 106. An adjusting screw 116 is mounted in the head block 106 by which the compression of the spring may be adjusted to vary the pressure of the tools upon the work.

The upper scoring die 118 is attached by screws 120 to the lower end of a bearing plate 122 which is secured to the bracket 92 of the carrier by set screws 124. The die 118 places the mark 30, shown in Fig. 20, at the breast line of a sole to indicate the end of the reinforcing fabric, and the position of the welt butting operation. As shown in Fig. 18, the scoring die may be reversed from the position shown in Fig. 17 in order to place the scoring mark in advance of the breast line, this mark being used on solid insoles to indicate the starting and finishing of the welt sewing operation.

The upper width marking tool consists of a series of dies, corresponding to the width dies 44, which are formed on the periphery of a wheel 126. The wheel 126 is secured to the flange 128 on a cylindrical sleeve 130, Figs. 4 and 19, which is mounted to rotate freely upon a shaft 132 secured between the bearing plate 122 and the marker carrier. To adjust the dies on the wheel 126 for different widths of soles a gear 134 is splined to the sleeve 130, Figs. 3 and 4, which articulates with a spiral gear 136 loosely splined upon a shaft 138. The shaft 138 is journaled in brackets 140 on the carrier, and a bracket 142 formed on the machine frame 50. The spiral gear 136 is held in position between the brackets 140 so that it will participate in the vertical movement of the marker carrier and slide upon the shaft 138. The lower end of the shaft 138 carries a bevel gear 144 which articulates with a bevel gear 146 secured to the width adjusting shaft 80. By this construction an adjustment of the width dial 82 will simultaneously set the dies in the width wheel 68 mounted in the support, and the width wheel 126, mounted in the carrier.

The size marking tool consists of a wheel 148, Figs. 3 and 4, having a series of size dies formed on its periphery, which correspond to the size dies 46. The size wheel 148 is secured to a flange 150 formed on a sleeve 152, which is freely rotatable upon the sleeve 130. To adjust the dies of the wheel 148 for marking the different sizes of soles a gear 154 is splined to the sleeve 152 and articulates with a spiral gear 156 which is splined to a shaft 158. The shaft 158 is journaled in brackets 160 formed on the marker carrier, and in brackets 162, formed in the machine frame 50. The spiral gear 156 is locked in position between the brackets 160 to participate in the vertical reciprocating movement of the marker carrier so that it will slide upon the shaft 158. Upon the lower end of the shaft 158 is mounted a spiral gear 164, which articulates with a gear 166, Fig. 3, secured to the rear face of the size wheel 54 on the size adjusting shaft 56. By this construction, when the size dial is adjusted for marking different sizes of soles, the dies on the wheels 148 and 54 will be simultaneously set for marking different sizes of soles.

The center line 36, shown in Fig. 20, is used to indicate the position of the back seam of the upper and to assist in positioning the counter. This center line is made by a marker 168 which is mounted in an abutment 170, projecting from the lower face of a sleeve 172, Figs. 3 and 19, loosely mounted upon the size marking wheel sleeve 152. The upper portion of the sleeve 172 is provided with a pair of lugs 174, which are arranged to rest against bearings 176, Figs. 4 and 19, formed on the lower face of the bracket 92 so that the sleeve is rigidly secured in position.

The lip cutting knives 178 are mounted in the marker carrier in slide 180 which are adjustable toward and away from the center of the machine to set the knives so that they will place cuts near the margin of the sole from the base of the lip to the edge of the sole. The slides 180, Figs. 1, 14, and 15, are provided with a block 182 which slides in a dove-tailed slot 184 formed in the bracket 92 of the marker carrier. A threaded boss 186 is formed in the upper side of the slide to receive a hand adjusting screw 188. The adjusting screw is fixed in a boss 190 formed on the bearing plate 122, and has a right and left thread at opposite sides of the bearing plate at its connection with the bosses 186 on the slides. With this construction, a rotation of the hand screw 188 will give the slides a relative receding or approaching movement. The lip knives 178 are secured in the slides by means of clamping plates 192, and are held in adjusted position by means of set screws 194 which are mounted in the slides and bear against the upper edges of the knives. Thus the cutting depth of the knives may be varied independently of the adjustment of the marker carrier.

Referring to Figs. 16, 17 and 18, it will be observed that the arrangement of the marking tools in the marker carrier and in the support is such that a rigid anvil is formed in the support to receive the impact of the tools of the marker carrier, and the marker carrier is provided with a striking surface to drive the sole against the tools of the support. The scoring tool 42 acts as an anvil to receive the impact of the scoring tool 118 and the lip knives 178. The width marking dies 44 act as anvils to receive the impact of the width marking wheel 126. The size marking die 46 in the support is not opposite the size wheel 148 on the marker carrier, so that an anvil plate 196, Fig. 5, is mounted in the face of the support 48 and has an anvil 198 to receive the impact of the size wheel 148. The abutment 170 on the center line marker acts to drive the sole against the size marking dies 46, and the dies 46, in turn, act as anvils to receive the impact of the forward end of the center line marker 168. To receive the impact of the rear end of the center line marker, an anvil plate 200, see Figs. 4, 5, and 16, is attached to the bottom of the support 48 and has an anvil 202, projecting up through and flush with the face of the support.

To locate the operation of the tools upon the sole, the sole is positioned from the heel end by means of a heel fork 204, Figs. 1, 3, 4, and 5, which is adjustable longitudinally of the support to provide for the different sizes of soles. The heel fork is attached by means of a set screw 206 to a slide which moves in guides formed in the support 48. To adjust the slide for the different sizes of soles, a stud 208 is mounted in the slide and carries a roll 210, which works in a spiral groove 212 in the face of a cam 214 which is loosely splined upon the size adjusting shaft 56. By this arrangement an adjustment of the size dial 64 will rotate the cam 214 and correspondingly adjust the heel fork 204.

The position of the breast line of a sole varies, as is well known in the art, for different styles of heels, the usual heel styles being, the long, short and regular. In order, therefore, that the scoring tools 42 and 118 and the lip knives 178 may mark the sole at the breast line, it is necessary that the size adjustment of the heel fork should be modified to provide for the different styles of heels. This modifying adjustment is made by a heel style adjusting lever 216, Figs. 1, 4 and 5, which projects through the side of the machine frame 50 and is pivotally mounted upon a stud 217 in the frame. The forward end of the lever 216 carries a roll 218, Fig. 3, which projects into an annular groove 220 formed on the face of the cam 214. A movement of the cam lever will serve to shift the cam 214 along the shaft 56 and at the same time adjust the heel fork. The setting of the cam roll 210 in the spiral groove 212 is not modified, however, by this adjustment. A spring-pressed plunger 222 is mounted in the outer end of the lever 216 and arranged to project into notches 224 formed in a locking plate 226. The locking plate is secured to an adjusting plate 228 which is attached to the side of the machine frame 50. It is well known that the different designs of heels are made by different designers but the difference in length of the heels for the three recognized styles of the different designs is practically constant. The three notches 224 in the locking plate 226 will provide for the three styles of heels, and in order to take care of the differences in design of heels the locking plate 226 is adjustable along the plate 228 by means of a set screw 230, which works in a slot in the plate 226.

The heel fork acts to longitudinally position a sole upon the support, and to transversely position the sole upon the support a pair of gages is employed which engage opposite edges of the sole and operate to transversely center the sole. The gages which consist of a preliminary centering gage and a disappearing gage are mounted in the machine frame 50 in advance of the scoring markers and move transversely back and forth in slots in the support 48. The preliminary centering gage consists of a bell crank lever 230, which is pivotally mounted on a stud 234, threaded into the front face of the frame 50. The upper arm of the lever 230 projects above the surface of the support 48 in a position to engage the edge of the sole, and is normally held against a stop 236, which is adjustably mounted on the machine frame 50. The lower arm of the lever 230 is provided with a gear segment 238, which articulates with a gear segment 240 formed on an arm 242 of the disappearing gage. The disappearing gage consists of a lever 232 fixed to a shaft 244, Figs. 3, 4, 9, and 10, journaled in the frame 50, the lever 232 being normally held in engagement with the arm 242 by means of a tension spring 246, which is connected between pins in the lever 232 and arm 242. The arm 242 is loosely mounted on the shaft 244 and is provided with a lug 248 arranged to engage with a projection 250 on the lever 232. When the projection 250 is in engagement with the lug 248, the arm 242 will move with the lever 232 and at this time, through the gear segments 238 and 240, the gages will move simultaneously. The centering gages are normally moved toward the center of the machine by means of a tension spring 252 which is connected with the upper arm of a bell crank lever 254 pinned to the back end of the shaft 244, and an adjusting screw 256, mounted in the opposite side of the machine frame 50. To facilitate the entering and removing of the sole the gages are positively withdrawn from the sole after the marking operation. To this end, Figs. 3, 4, and 9, a rod 258 is connected between a stud 260 projecting back from the shaft 132 in the marker carrier, and a pin 262 in the lower arm of the bell crank lever 254. With this construction the operation of the gages is controlled by the movement of the marker carrier. In the first part of the movement of the marker carrier to mark a sole the rod 258 moves down and permits the spring 252 to rotate the shaft 244 and move the gages toward the center of the support. A slot 264 is formed in the rod 258 at its connection with the pin 262, which permits the continued movement of the rod with the marker carrier, and allows the closing movement of the centering gages to be completed by the spring 252.

To secure speed and convenience in feeding blanks, the operative generally supports the sole blanks in a stack and feeds the bottom blank from the stack into the positioning gages by a transverse movement across the table. To permit this operation the disappearing gage is constructed to have its upper end drawn down so as to disappear below the fact of the support 48. The upper end of the lever 232 consists of a sole engaging section 266, Figs. 1 and 9, which is pivoted to the upper end of the gage lever 232. A stop 268 is adjustably mounted on the machine frame 50 in position to engage the section 266 as the lever 232 is moved outwardly by the marker carrier, and operates to rotate the section 266 on its pivot and draw it down below the surface of the support, as shown in Fig. 9. The sole engaging face of the section 266 is normally held in alinement with the gage lever 232 by means of a leaf spring 270 which is attached to the lever 232 and bears against the face of the section 266. A pin 272 in the lever 232 is arranged to engage a tail 274 of the section 266 when the section is in alinement with the lever. With the construction outlined above, assuming that the gages are in contact with the edge of the sole, an upward movement of the marker carrier will operate through the rod 258 to rotate the shaft 244 and spread the levers 230 and 232 away from the sole. In the first part of the movement of the marker carrier the lever 230 will be brought into contact with the stop 236. The continued movement of the marker carrier will move the lever 232 relatively to the lever 230 and rotate the shaft 244 to draw the lever 232 away from the arm 242 against the action of the spring 246. When the lever 232 has been moved far enough to bring the section 266 into contact with the stop 268, the section will be moved below the surface of the support. On the active, or marking stroke of the marker carrier the first part of the stroke will permit the lever 232 to move relatively to the lever 230, and project the section 266 above the surface of the support. A continued movement of the lever 232 will bring the projection 250 into engagement with the lug 248 and then the levers 230 and 232 will move simultaneously to center the sole. The movement of the lever 230 is very slight so that it acts as a preliminary gage to guide the operative in preliminarily positioning the sole, and as the marker carrier comes down, the gages will be moved out into engagement with the edge of the sole and center it before the sole is marked.

The machine is operated by a one-revolution clutch, see Figs. 6, 7, and 8. A pulley 276 is rotatably mounted upon the main shaft 110 and is continuously operated by the driving belt. A clutch wheel 278 is pinned to the shaft 110 and is provided with a spring pressed plunger 280 which has a shank 282 arranged to project into a groove 290 formed in the face of the pulley. The plunger 280 is normally withdrawn from the groove in the pulley by means of a wedge lever 292 which is pivoted to the machine frame and connected by means of a rod 294 with a foot treadle, not shown. When the wedge lever 292 is withdrawn from the plunger 280, the plunger projects into the groove 290 in position to engage one of a pair of locking plates 296 secured in slots 298 in the face of the pulley 276. The wedge lever 292 is normally moved into position to engage and withdraw the plunger 280 by means of a spring 300 which is connected between an arm on the lever 292 and the machine frame. With the construction described above, if the wedge lever is withdrawn from the plunger 280 and then released, the plunger 280 will lock the clutch wheel 278 with the pulley 276 and the shaft will make one rotation when the wedge block will be moved by the spring 300 into position to withdraw the plunger 280 from the pulley 276. If, however, the wedge lever is held down by the foot treadle, the shaft will continue to rotate until it is released. In order to insure that the marker carrier will stop with the tools removed from the work, a braking face 302 is formed on the clutch wheel 278 which is surrounded by a friction band 304. The friction band is anchored to the machine frame and gives a constant braking action during the operation of the machine.

The preferred form of the invention having been thus described, what is claimed as new is:

1. A machine for preparing insoles, having, in combination, a sole marking device, a sole end gage for positioning the sole with relation to the marking device, mechanism to move the end gage for positioning different sizes of soles, and means to adjust said mechanism to cause the marking device to mark the sole for different styles of sole heels.

2. A machine for preparing soles, having, in combination, devices for operating upon a sole, a heel gage positioning member to position the sole with relation to said devices, a heel gage mounted on said member, a calibrated mechanism for setting said member in positioning different sizes of soles, and a calibrated mechanism to adjust said first mentioned mechanism.

3. A machine for preparing insoles, having, in combination, a sole support, means for positioning a sole on said support, a sole marking carrier opposite the support, size and width stamping dies adjustably mounted in the support and in the carrier, and means to relatively actuate the support and carrier to mark a sole.

4. A machine for preparing insoles, having, in combination, a sole support, means for positioning a sole upon the support, a sole marking carrier opposite the support, a size marking die adjustably mounted in the support, a corresponding size marking die adjustably mounted in the carrier, means to relatively move the support and carrier to mark the sole, and means to simultaneously adjust the markers, in the carrier and support, for treating different sizes of soles.

5. A machine for preparing insoles, having, in combination, a sole support, a marker carrier, means for positioning a sole upon the support, a set of marking dies adjustably mounted in the support, a set of marking dies adjustably mounted in the carrier, means to relatively move the carrier and support to mark a sole, and means to simultaneously and correspondingly adjust the marking dies of each set to position them for operating on different kinds of soles.

6. A machine for preparing insoles, having, in combination, a sole support, a marker carrier, means for positioning the heel end of a sole upon the support, a plurality of sole marking tools mounted in the support, a plurality of sole marking tools including a heel center line marker mounted in the carrier, and means to reciprocate the marker carrier to mark a sole.

7. A machine for preparing soles, having, in combination, a sole support, and mechanism for centering a sole upon the support comprising a preliminary positioning gage for one edge of a sole, a coöperating gage for the opposite edge of the sole movable independently of said preliminary positioning gage, and means to connect the gages for simultaneous movement to center a sole.

8. A machine for preparing soles, having, in combination, a sole support, and mechanism for centering a sole upon the support comprising a preliminary positioning gage normally projecting above the surface of the support to engage one edge of a sole, a disappearing gage normally held below the surface of the support to engage the opposite edge of the sole, and means to operate the disappearing gage to move it out and above the face of the support and simultaneously with the preliminary positioning gage, 9. A machine for preparing soles, having, in combination, a sole support, an end gage for longitudinally positioning a sole, a pair of centering gages to contact the opposite edges of the sole, said gages being connected for simultaneous movement and for movement independently of each other, and a connection between the marker and gages whereby the gages will be moved simultaneously and also independently of each other by the operation of the marker.

10. A machine for preparing soles, having, in combination, a sole support, mechanism for centering a sole upon the support comprising gages for contacting the opposite edges of a sole, means for moving the gages toward and from each other, a pivoted section on one of said gages and means whereby said section is drawn down below the surface of the support when the gages are moved away from the sole.

11. A machine for preparing soles, having, in combination, a sole support, mechanism for centering a sole upon the support comprising gages for contacting the opposite edges of a sole, means for moving the gages toward and from each other, a stop on the support to hold one of the gages above the surface of the support, a movable section on the other gage, and means for moving the second mentioned gage out into contact with the support to force the section down below the surface of the support.

12. A machine for preparing soles, having, in combination, a sole support, and means for transversely positioning a sole upon the support comprising a pair of gages for contacting the opposite edges of a sole which are connected for simultaneous movement, a spring for moving the gages into contact with the sole, means for positively withdrawing the gages from the sole, a stop to limit the withdrawing movement of one of the gages from the sole, and a yielding connection between the gages to permit an increased withdrawing movement of the other gage to facilitate the entering and removing of the sole.

13. A machine for preparing soles, having, in combination, a sole support, an end gage for longitudinally positioning the sole, and a pair of centering gages to contact at opposite edges of the sole, one of said gages having one section in articulation with the other gage, and another section movable relatively to the first section and means for moving said gages simultaneously and also relatively to one another.

WILLIAM C. STEWART.